United States Patent [19]
Karl et al.

[11] Patent Number: 4,987,116
[45] Date of Patent: Jan. 22, 1991

[54] METHOD OF PREPARING A COARSE-PORED FORMED CARBON

[76] Inventors: Alfons Karl, Herzbergstrasse 53, D-6466, Gruendau, Fed. Rep. of Germany; Hartmut von Kienle, Hirschograben 21, D-6056, Heusenstamm-2, Fed. Rep. of Germany

[21] Appl. No.: 415,980

[22] Filed: Oct. 3, 1989

[30] Foreign Application Priority Data

Oct. 12, 1988 [DE] Fed. Rep. of Germany ....... 3834743

[51] Int. Cl.$^5$ .................... B01J 20/32; B01J 20/20; C01B 31/10
[52] U.S. Cl. ................... 502/427; 502/417; 502/418; 502/437
[58] Field of Search ............ 502/427, 417, 429, 418, 502/437; 264/29.5

[56]  References Cited
U.S. PATENT DOCUMENTS

| 1,200,713 | 10/1916 | Drohn | 502/427 |
| 3,817,874 | 6/1974 | Wennerberg et al. | 502/427 |
| 4,039,473 | 8/1977 | Schaffer | 423/449 |
| 4,458,022 | 7/1984 | Ohsaki | 502/437 |
| 4,603,119 | 7/1986 | Karl et al. | 502/437 |
| 4,742,040 | 5/1988 | Ohsaki et al. | 502/417 |

Primary Examiner—Paul E. Konopka

[57] ABSTRACT

Described is a method for preparing a coarse-pored formed carbon from charcoal dust, charcoal tar and sodium hydroxide solution. These ingredients are mixed, kneaded, shaped and low-tempeature carbonized in as low-oxygen atmosphere as possible at temperatures of 300 to 900° C. The product is further activated with water vapor and/or carbon dioxide at temperature of 700 to 1200° C. In the initial mixture, sodium hydroxide is added in amounts of 5.0 to 15.0 % by weight relative to the amount of charcoal dust.

5 Claims, No Drawings

METHOD OF PREPARING A COARSE-PORED FORMED CARBON

BACKGROUND OF THE INVENTION

The present invention relates to a method of preparing a coarse-pored formed carbon from charcoal dust, charcoal tar and sodium hydroxide solution. The method includes mixing, kneading, shaping and low-temperature carbonization of the shaped mixture in as low-oxygen atmosphere as possible at temperatures of 300 to 900° C. The method further includes activation with water vapor and/or carbon dioxide at temperatures of 700 to 1200° C.

Formed carbon is used as absorption agent in percolation decolorization, e.g. in the preparation of methionine; for the separation of high-boiling liquids; or as catalytic carrier.

The use of a formed carbon produced from lignite (brown coal) for these applications is known.

The use of lignite as a raw-material base has the disadvantage that variations occur in the quality of the formed carbon.

Some prior art processes are described in Kirk-Othmer, *Encyclopedia of Chemical Terminology*, 3rd Edition, Vol. 4, pgs. 561–569, "Activated Carbon". This material is incorporated herein by reference.

BRIEF DESCRIPTION OF THE INVENTION

An object of the invention resides in providing a method for the preparation of a coarse-pored formed carbon from charcoal dust, charcoal tar and sodium hydroxide solution by means of mixing, kneading, shaping and low-temperature carbonization of the shaped mixture in as low-oxygen atmosphere as possible at temperatures of 300 to 900° C. This product is activated with water vapor and/or carbon dioxide at temperatures of 700 to 1200° C. The sodium hydroxide, in the initial mixture, is added in amounts of 5.0 to 15.0 % by weight relative to the amount of charcoal dust.

The sodium hydroxide may be added in a preferred embodiment in the form of an aqueous solution.

The concentration of this sodium hydroxide solution can be at least 25 % by weight, preferably 30 to 50 % by weight and advantageously 35 to 50 % by weight.

The low-temperature carbonization can be carried out in a temperature range of 400 to 600° C.

The activation can be carried out in a temperature range of 800 to 1000° C.

The method of the invention can be carried out in known mixing, kneading, shaping, low-temperature carbonization and activating devices.

The method of the invention has the advantage that high yields are obtained by the low-temperature carbonization and activation process, as well as products with a high percentage of coarse pores are obtained.

DETAILED DESCRIPTION OF THE INVENTION

The examples that follow serve to illustrate the detailed aspects of the invention. Mixing, kneading and shaping tests:

The base components, charcoal dust, charcoal tar and sodium hydroxide solution, are mixed and kneaded in a Z kneader, whereby the sodium hydroxide solution and the amount of water indicated in table 2 are premixed.

The mixture obtained in this manner is formed in an extruder.

TABLE 1

| Mixing, kneading and pressing conditions | |
| --- | --- |
| Mixing sequence: | dust, tar, sodium hydroxide solution/water |
| Kneading time: | 15 min. |
| Matrix: | multihole matrix with 1.6 mm bores. |

TABLE 2

| | Mixing compositions | | | |
| --- | --- | --- | --- | --- |
| | Ex. 1 | Ex. 2 | Ex. 3 | Ref. Ex. 4 |
| charcoal dust (g) | 1920 | 1920 | 1920 | 1920 |
| charcoal tar (g) | 1140 | 1140 | 1140 | 1140 |
| 40% sodium hydroxide solution (g) | 640 | 480 | 320 | 0 |
| water (g) | 40 | 40 | 40 | 140 |
| NaOH content* (% by weight) | 13.3 | 10.0 | 6.7 | 0 |

*relative to the amount of charcoal dust.

Low-temperature carbonization tests

The low-temperature carbonization of the green, extruded blanks takes place in a rotating cylinder kiln at 500° C. under an atmosphere free of oxygen.

TABLE 3

| Low-temperature carbonization conditions | |
| --- | --- |
| Rotating cylinder: | indirectly heated |
| heated length: | approx. 2700 mm |
| inner diameter: | approx. 380 mm |
| tube inclination: | approx. 2° |
| rpms: | approx. 7.5 rpms |
| carbon charge: | approx. 5 kg/h |
| carrier gas: | approx. 1,150 liters per hour of nitrogen |
| vacuum: | approx. 20 mm water column. |

TABLE 4

| Results of low-temperature carbonization | | |
| --- | --- | --- |
| | yield of low-temperature carbonization* | volatile contents |
| Example 1 | 74.5% by wt. | 17.6% by wt. |
| Example 2 | 70.9% by wt. | 17.4% by wt. |
| Example 3 | 67.4% by wt. | 10.2% by wt. |
| Reference Example 4 | 47.4% by wt. | 10.2% by wt. |

*relative to the moisture-free green material.

Note the increased yield with the addition of sodium hydroxide.

Activation tests

The activation of the extruded blanks carbonized at low temperature in Examples 1–4 took place in a rotating cylinder at an activating temperature of 850 and 950° C.

TABLE 5

| Activating conditions | |
| --- | --- |
| rotating tube: | indirectly heated |
| heated length: | approx. 1000 mm |
| inner diameter: | approx. 100 mm |
| tube inclination: | approx. 1° |
| rpms: | approx. 7.5 rpms |
| overflow height: | approx. 15 mm |
| water vapor: | 1000 g/h |
| carbon charge: | 600–900 g/h |
| vacuum: | approx. 10 mm water column. |

After activation, the products were washed thoroughly with water and dried. The results of activation are listed in Table 6.

TABLE 6

| | Activ. Temp. °C. | Carbon Charge g/h | Kiln Yield % by wt. | Benzene Isotherms AS (% by wt.) | | | | Iodine No. mg/g | Methylene Blue titer ml/0.1 g | Molasses mg No. | Bump Hardness % by wt. | Rolling wear % by wt. | Vibration density g/l |
|---|---|---|---|---|---|---|---|---|---|---|---|---|---|
| | | | | 9/10 | 1/10 | 1/100 | 1/1000 | | | | | | |
| Ex. 1a | 850 | 600 | 42.3 | 70.9 | 36.1 | 24.7 | 16.2 | 1220 | 18.0 | 290 | 83.4 | 88.0 | 245 |
| Ex. 1b | 850 | 720 | 49.9 | 54.1 | 33.7 | 25.7 | 16.4 | 1170 | 16.5 | 565 | 88.0 | 90.8 | 280 |
| Ex. 1c | 950 | 900 | 39.1 | 57.3 | 40.4 | 26.5 | 16.4 | 1210 | 17.5 | 555 | 85.6 | 89.4 | 255 |
| Ex. 2 | 850 | 600 | 48.6 | 60.5 | 35.4 | 25.6 | 17.3 | 1190 | 17.5 | 540 | 88.4 | 88.2 | 260 |
| Ex. 3 | 850 | 600 | 48.1 | 55.5 | 33.9 | 25.4 | 17.7 | 1180 | 16.0 | 600 | 88.2 | 90.4 | 290 |
| Ref. Ex. 4 | 850 | 600 | 65.0 | 29.0 | 19.7 | 16.6 | 12.5 | 700 | 3.5 | 1400 | 84.0 | 96.6 | 410 |

The activated carbons according to Examples 1a, 1b and 1c were mixed, kneaded and carbonized at a low temperature in accordance with Example 1. The different carbons were obtained by means of the different activating conditions such as activating temperature and carbon charge.

While the invention has been described with particular examples and compositions cited, various modifications and changes may be made without departing from the spirit and scope of the claims.

What is claimed is:

1. A method of preparing a coarse-pored formed carbon comprising the steps of:
   (A) mixing charcoal dust, charcoal tar and sodium hydroxide solution to form a mixture, wherein the sodium hydroxide is present in the amount of 5 to 15% by weight relative to the amount of charcoal dust;
   (B) kneading the mixture;
   (C) shaping the kneaded mixture;
   (D) low temperature carbonization of the shaped mixture in an atmosphere almost free of oxygen, at temperatures in the range of 300 to 900° C.; and
   (E) activation with water vapor and/or carbon dioxide at temperatures in the range of 700 to 1200° C.

2. The method according to claim 1, characterized in that the low-temperature carbonization is carried out at temperatures in a range of 400°–600° C.

3. The method according to claim 1, characterized in that the activation is carried out at temperatures in a range of 800°–1000° C.

4. The method according to claim 2, characterized in that the activation is carried out at temperatures in the range of 800°–1000° C.

5. The method according to claim 1, wherein said charcoal dust is present in the amount of 50–60% by weight relative to said mixture and wherein said charcoal tar is present in the amount of 30 to 35% by weight relative to said mixture.

* * * * *